(12) United States Patent
Eaves (10) Patent No.: US 11,541,711 B1
(45) Date of Patent: Jan. 3, 2023

(54) MULTI-TRAVEL SUSPENSION TRAILER

(71) Applicant: Ronny Dean Eaves, Atoka, OK (US)

(72) Inventor: Ronny Dean Eaves, Atoka, OK (US)

( * ) Notice: Subject to any disclaimer, the term of this patent is extended or adjusted under 35 U.S.C. 154(b) by 0 days.

(21) Appl. No.: 17/213,633

(22) Filed: Mar. 26, 2021

Related U.S. Application Data (60) Provisional application No. 63/006,347, filed on Apr. 7, 2020.

(51) Int. Cl.
*B60G 11/26* (2006.01)
*B60G 11/27* (2006.01)
*B62D 63/06* (2006.01)

(52) U.S. Cl.
CPC ............ *B60G 11/265* (2013.01); *B60G 11/27* (2013.01); *B62D 63/068* (2013.01); *B60G 2202/152* (2013.01); *B60G 2300/042* (2013.01)

(58) Field of Classification Search
CPC .................. B60G 11/265; B60G 11/27; B60G 2202/152; B60G 2300/042; B60G 11/26; B62D 63/068; B62D 63/06; B62D 21/20
See application file for complete search history.

(56) References Cited

U.S. PATENT DOCUMENTS

| | | | | | |
|---|---|---|---|---|---|
| 2,395,640 | A * | 2/1946 | Pearson | ............... | B60G 11/265 280/81.1 |
| 2,879,076 | A * | 3/1959 | Stricker, Jr. | ............ | B60G 11/27 280/676 |
| 3,003,782 | A * | 10/1961 | Hickman | ............... | B60G 11/64 280/124.106 |
| 4,202,564 | A * | 5/1980 | Strader | .................... | B60G 5/04 280/124.158 |
| 4,871,188 | A * | 10/1989 | Baxter | ..................... | B60G 5/02 280/680 |
| 5,366,237 | A * | 11/1994 | Dilling | .................. | B60G 9/003 280/124.116 |
| 5,718,445 | A * | 2/1998 | VanDenberg | ............ | B60G 5/00 105/168 |
| 5,944,339 | A * | 8/1999 | McKenzie | ............... | B60G 5/04 280/678 |
| 6,056,305 | A * | 5/2000 | Pribyl | ...................... | B60G 7/02 280/124.157 |
| 6,340,165 | B1 * | 1/2002 | Kelderman | ............ | B60G 7/001 280/124.153 |
| 6,435,526 | B1 * | 8/2002 | Karlsson | ................ | B62D 61/12 180/209 |
| 6,769,703 | B1 * | 8/2004 | VanDenberg | ............ | B60G 9/02 267/256 |

(Continued)

FOREIGN PATENT DOCUMENTS

DE 202005020716 U1 * 7/2006 ............. B62D 21/20
EP 3216631 A1 * 9/2017 ............. B60G 11/28

(Continued)

*Primary Examiner* — Paul N Dickson
*Assistant Examiner* — Kurtis Nielson
(74) *Attorney, Agent, or Firm* — Phillips Murrah PC; Martin G. Ozinga (57) ABSTRACT

The present invention comprises a trailer main frame with a first rocker assembly and a second rocker assembly pivotally attached to the trailer main frame wherein the rocker assemblies are attached to leveling means such as but not limited to hydraulic and or air system between the trailer main frame and the rocker assemblies.

2 Claims, 8 Drawing Sheets

(56) References Cited

U.S. PATENT DOCUMENTS

| | | | | |
|---|---|---|---|---|
| 6,916,037 B2* | 7/2005 | Baxter | ............ | B60G 5/00 280/124.104 |
| 7,077,411 B2* | 7/2006 | Peters | ............ | B60G 5/02 280/124.132 |
| 7,178,824 B2* | 2/2007 | Ziech | ............ | B60G 5/053 280/678 |
| 7,320,469 B2* | 1/2008 | Bromley | ............ | B60G 5/02 280/5.514 |
| 9,039,034 B2* | 5/2015 | VanDenberg | ............ | B60G 11/18 280/684 |
| 9,102,206 B1* | 8/2015 | Saieg | ............ | F16D 65/28 |
| 10,500,913 B1* | 12/2019 | Whitney | ............ | B60G 11/12 |
| 2004/0232646 A1* | 11/2004 | Peters | ............ | B60G 7/001 280/124.132 |
| 2009/0243247 A1* | 10/2009 | Richardson | ............ | B60G 11/46 280/124.109 |
| 2013/0033018 A1* | 2/2013 | Kiselis | ............ | B60G 5/00 280/124.116 |
| 2014/0265205 A1* | 9/2014 | Dudding | ............ | B60G 11/27 280/124.116 |

FOREIGN PATENT DOCUMENTS

| | | | | |
|---|---|---|---|---|
| FR | 2518940 A1 * | 7/1983 | ............ | B60P 1/02 |
| WO | WO-9706022 A1 * | 2/1997 | ............ | B60B 35/08 |
| WO | WO-0108909 A1 * | 2/2001 | ............ | B60G 11/27 |
| WO | WO-2007143787 A1 * | 12/2007 | ............ | B60G 17/0521 |
| WO | WO-2019119090 A1 * | 6/2019 | ............ | B60B 35/00 |
| WO | WO-2020057460 A1 * | 3/2020 | | |

\* cited by examiner

MULTI-TRAVEL SUSPENSION TRAILER

CROSS-REFERENCE TO RELATED APPLICATIONS

The present application claims priority from U.S. Provisional Patent application Ser. No. 63/006,347 filed on Apr. 7, 2020, currently pending and incorporated by reference herein.

BACKGROUND OF THE INVENTION

1. Field of the Invention

In general, the present invention relates to an apparatus, system, and method of manufacturing a new and improved trailer. More particularly, the present invention provides a trailer with a superior suspension that can be utilized in multiple applications where it is desirable to provide leveling support for large payloads.

2. Description of the Prior Art

Trucks carry 73% of cargo by weight in the United States of the 4 million shipments of dangerous goods every day, 94% are carried by trucks. The truck, also referred to as tractor, itself usually has 10 wheels and is around 20-25 feet long. When it is connected to a trailer, it becomes a tractor-trailer combination vehicle with 18 wheels. The trailer is usually 53 feet long. Tractors can pull two or three trailers, if the combination is legal in that state. Weight maximums are 20,000 lbs (9,100 kg) on a single axle, 34,000 lbs (15,000 kg) on a tandem, and 80,000 lbs (36,000 kg) total for any vehicle or combination. Federal DOT and States DOT allow for more payload if the axles or group of axles are spread further apart yet maintaining +or−5% of each other.

On the market today, 90% of all trailers have air ride suspensions. The design on these suspensions have an up and down travel of 6" (3" up, 3" down) and will maintain balanced loading if staying in those parameters, once it gets outside of that parameter, loading becomes uneven on the axle groups, causing wear and fatigue to all components, such as but not limited to tires, wheels, brakes, and so forth. This is where the problems come in, all trailer manufacturers are building trailers with more axles spread further apart to capture an industry that wants to haul the most payload. Conventional designs on uneven terrain and improper loading will not allow these units to maintain even loading on all axles.

Accordingly, what is needed in the art is a new and improved trailer suspension system to maximize load weight to avoid these several longstanding limitations and disadvantages prevalent in the prior art. This need is fulfilled by embodiments of the present invention. The above discussed limitations in the prior art is not exhaustive. The current invention provides an inexpensive, time saving, more reliable apparatus, system, and method where the prior art fails.

SUMMARY OF THE INVENTION

In view of the foregoing disadvantages inherent in the known types of trailers now present in the prior art, the present invention provides a new and improved trailer with multi-travel suspension, which may be utilized in numerous applications. As such, the general purpose of the present invention, which will be described subsequently in greater detail, is to provide a new and improved trailer with multi-travel suspension, which has all the advantages of the prior art devices and none of the disadvantages.

To attain this, the present invention essentially comprises a trailer main frame with a first rocker assembly and a second rocker assembly pivotally attached to the trailer main frame. The rocker assemblies are attached to leveling means such as but not limited to hydraulic and or air system between the trailer main frame and the rocker assemblies.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention. Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved trailer with multi-travel suspension system that will allow conventional suspension equal load balance for heavier payloads for load distribution on a mid-rocker design when the load on the leading axle group exceeds the designed load limit and forcing it upward while simultaneously forcing the rear group down.

It is a further object of the present invention to provide a new and improved trailer with multi-travel suspension system that is of a durable and reliable construction and may be utilized with multiple applications.

An even further object of the present invention is to provide a new and improved trailer with multi-travel suspension system, which is susceptible to a low cost of manufacture with regard to both materials and labor, and which accordingly is then susceptible to low prices of sale to the consuming industry, thereby making such economically available to those in the industry.

Still another object of the present invention is to provide a new and improved trailer with multi-travel suspension system that provides all of the advantages of the prior art, while simultaneously overcoming some of the disadvantages normally associated therewith.

Another object of the present invention is to provide a new and improved trailer with multi-travel suspension system, which may be easily and efficiently manufactured and marketed.

Yet another object of the present invention is to provide a new and improved trailer with multi-travel suspension system that provides a 2-axle, 4-axle, 6-axle, 8-axle, and so forth design.

An even further object of the present invention is to provide a new and improved trailer with multi-travel suspension system that may utilize pneumatic air bags and or hydraulic cylinders Still another object of the present invention is to provide a new and improved trailer with multi-travel suspension system that provides a load leveling for small heavy objects to meet Department of Transportation guidelines.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices wherein.

DETAILED DESCRIPTION OF THE PREFERRED EMBODIMENTS

Figure 1:
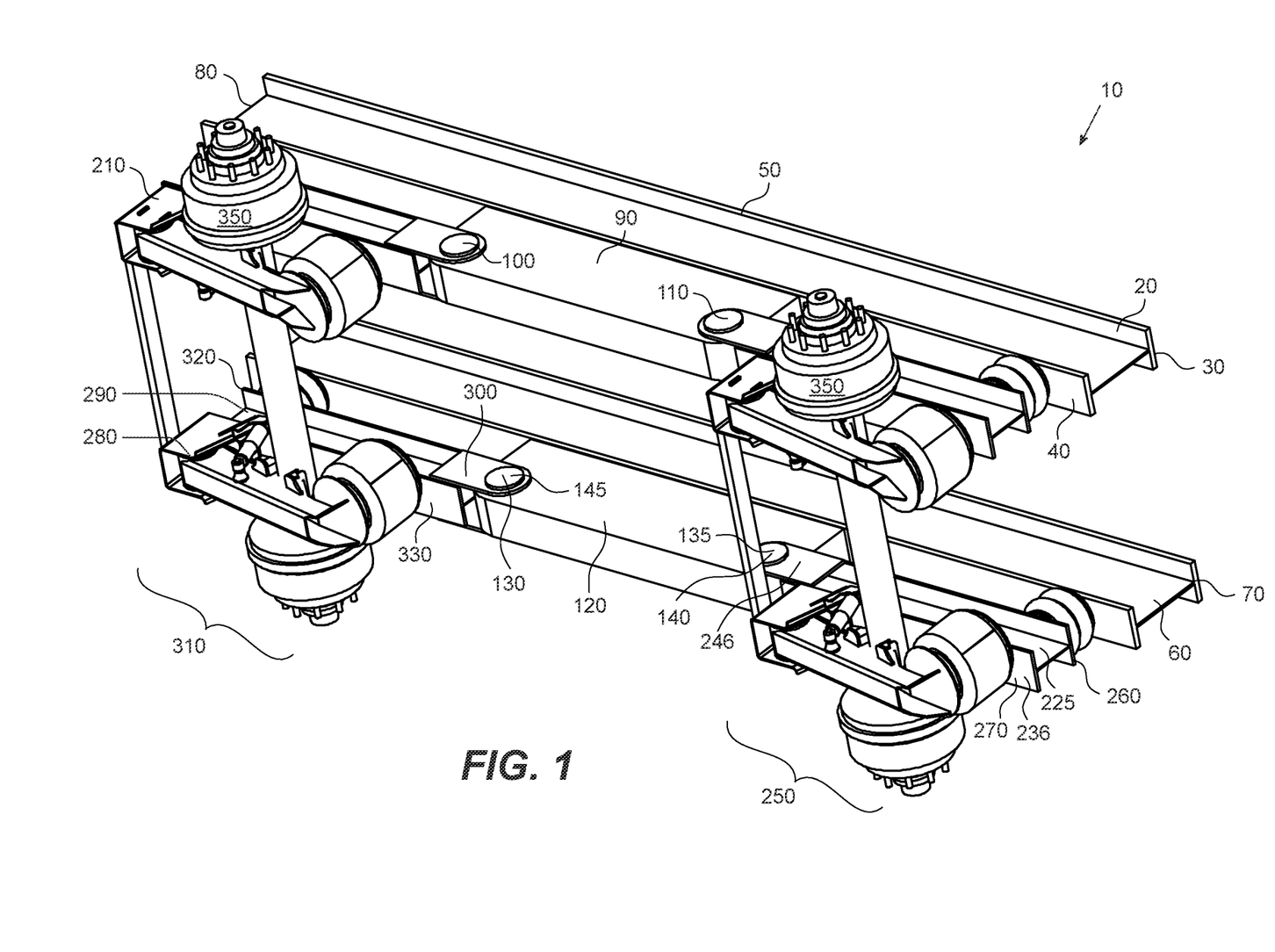
FIG. 1 is an illustration of a preferred embodiment of the invention.
Figure 2:
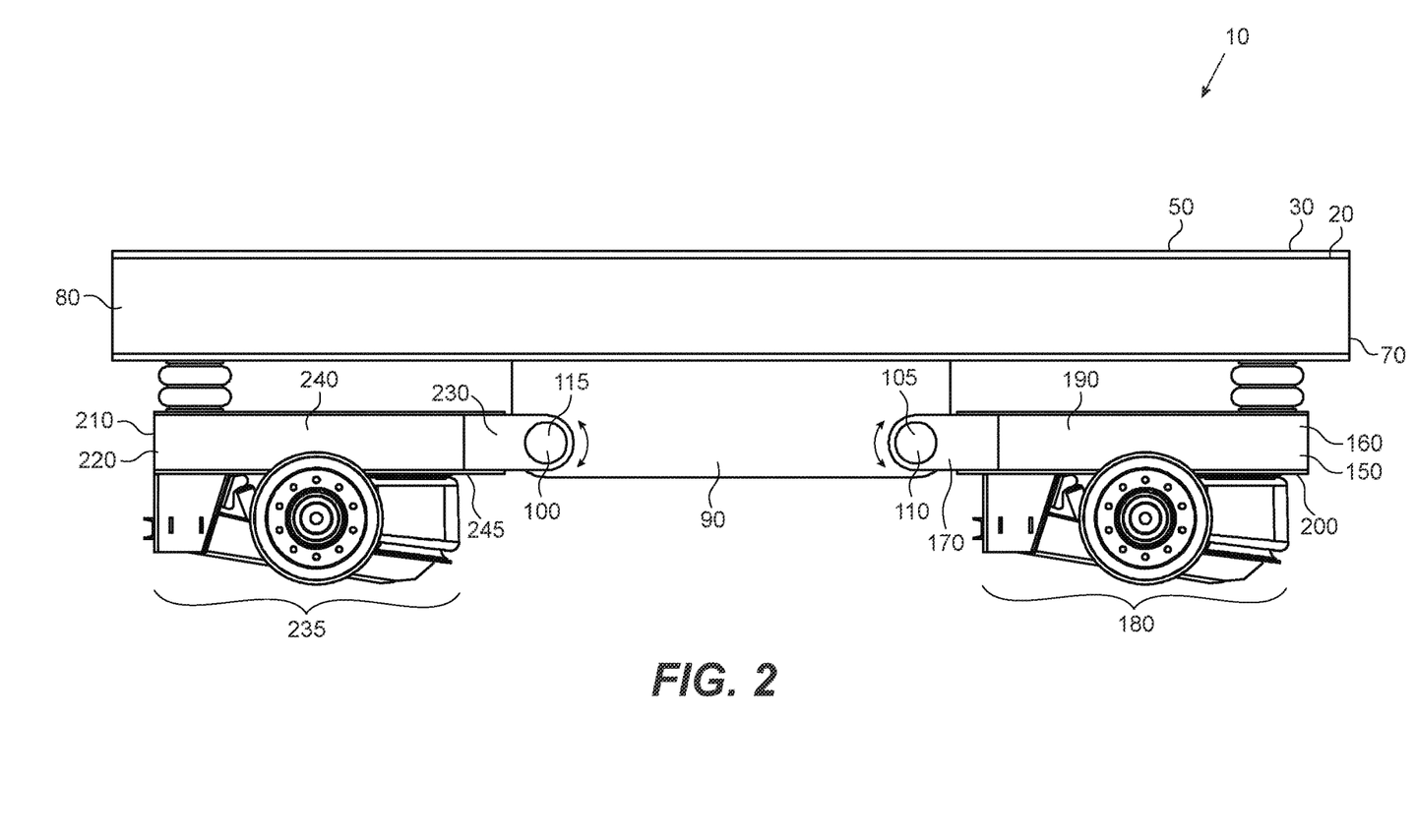
FIG. 2 is an illustration of a preferred embodiment of the invention.
Figure 3:
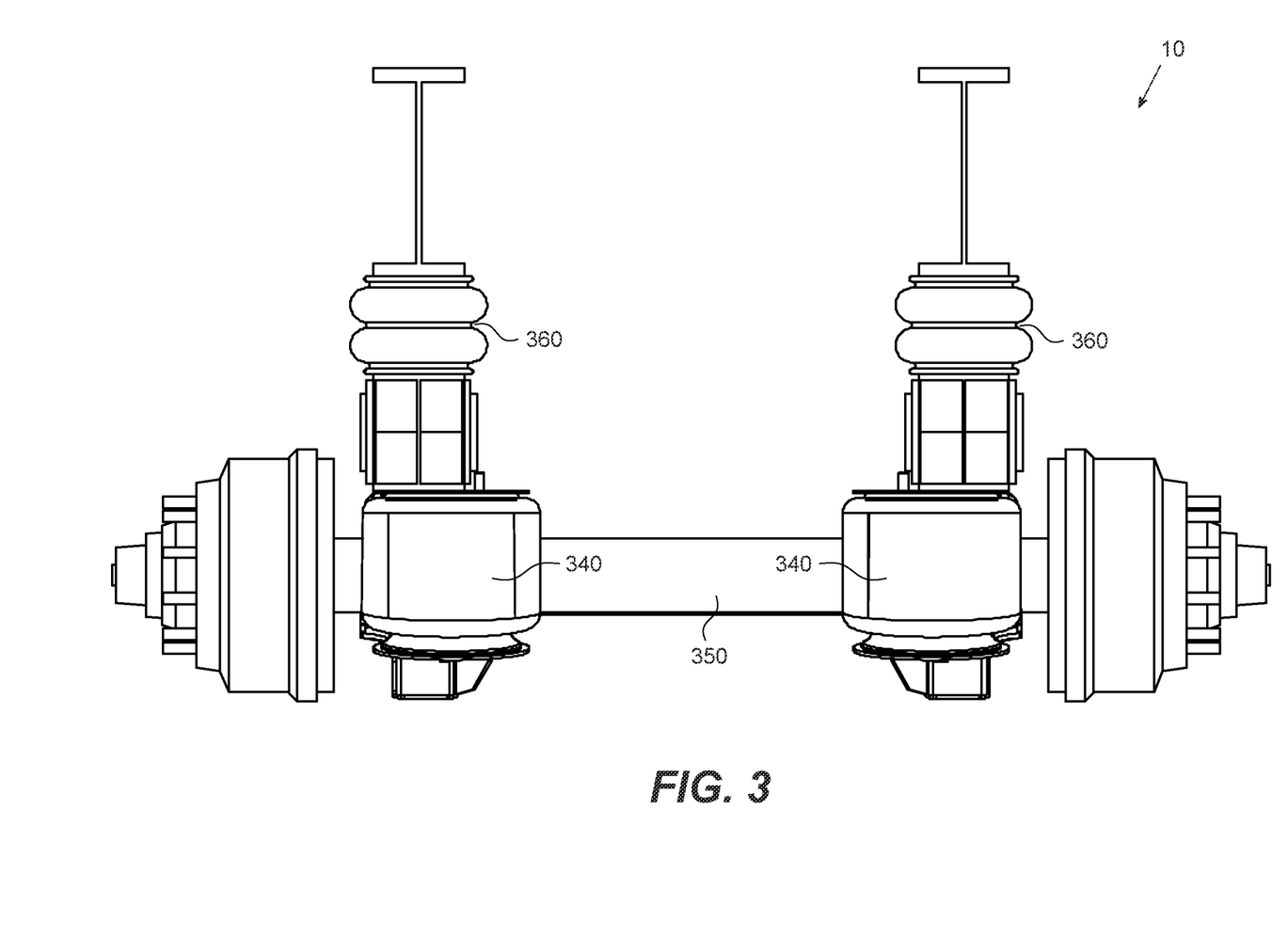
FIG. 3 is an illustration of a preferred embodiment of the invention.
Figure 4:
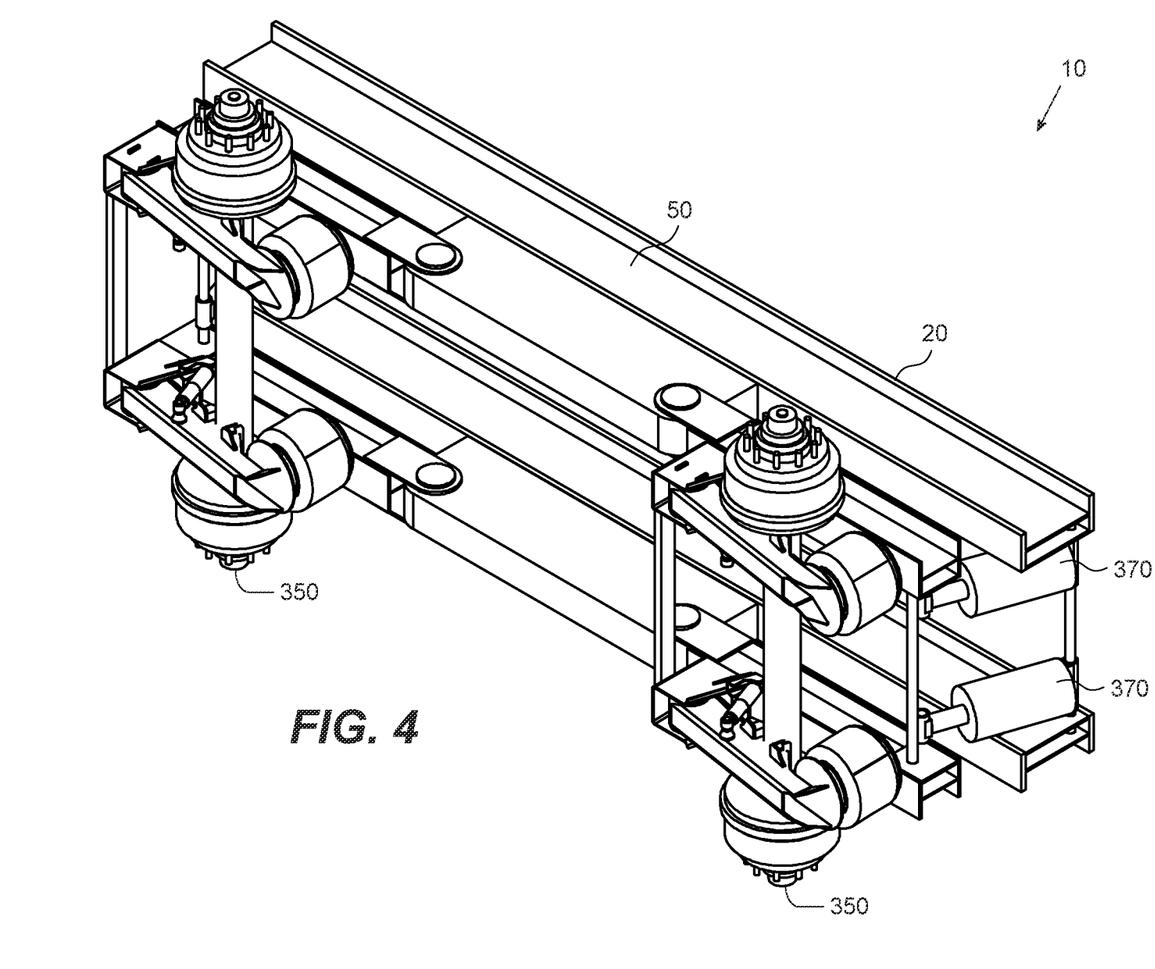
FIG. 4 is an illustration of a preferred embodiment of the invention.
Figure 5:
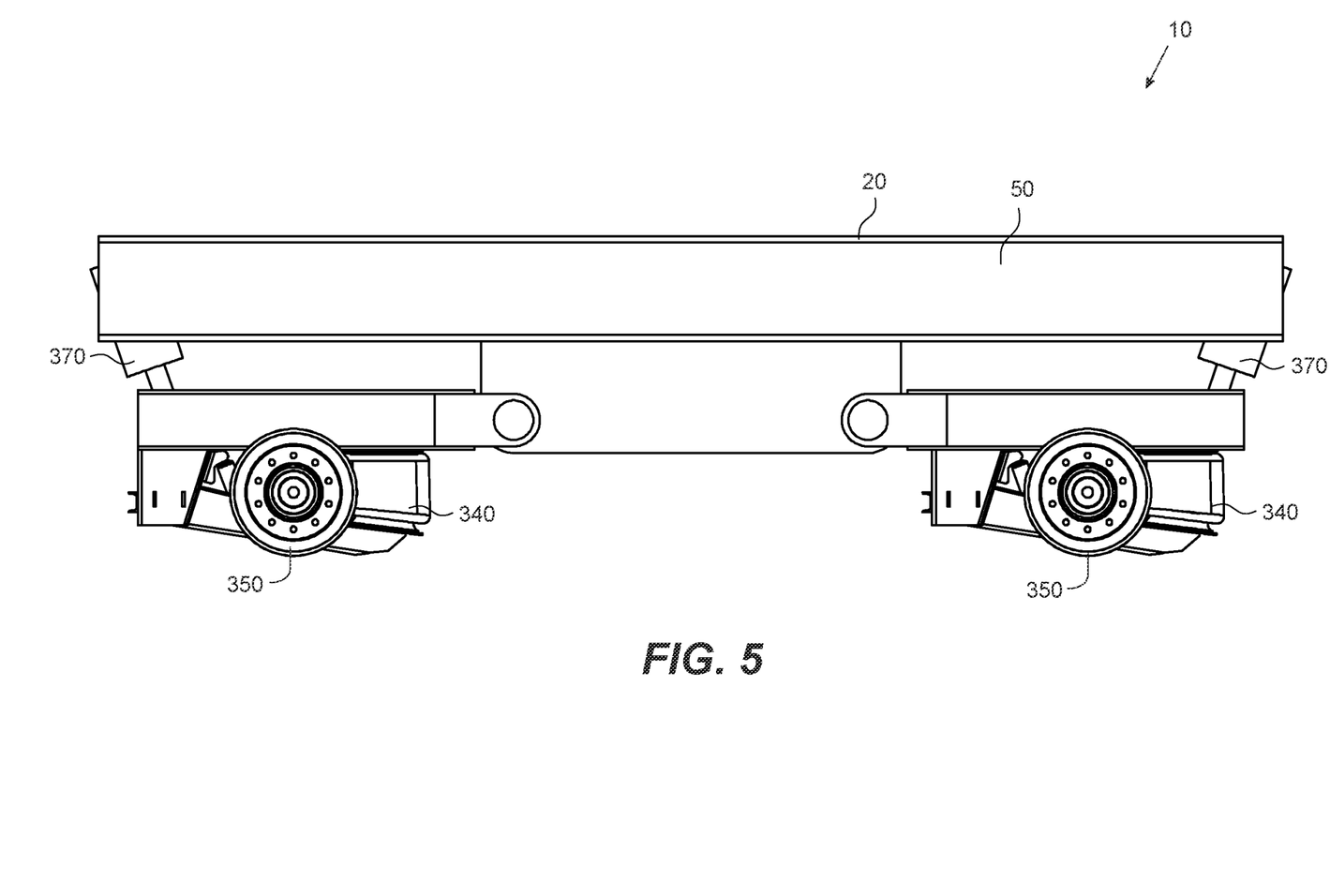
FIG. 5 is an illustration of a preferred embodiment of the invention.
Figure 6:
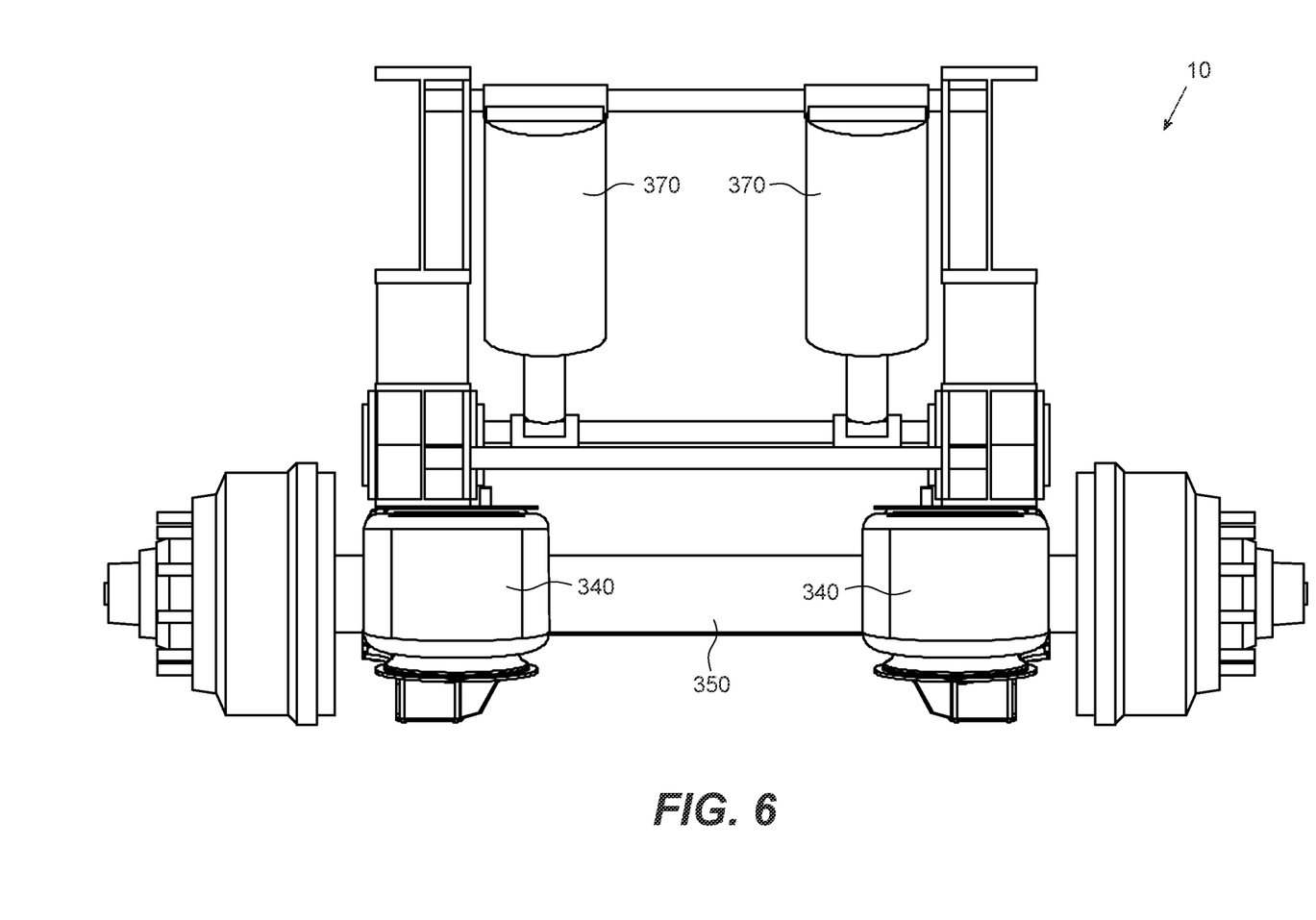
FIG. 6 is an illustration of a preferred embodiment of the invention.
Figure 7:
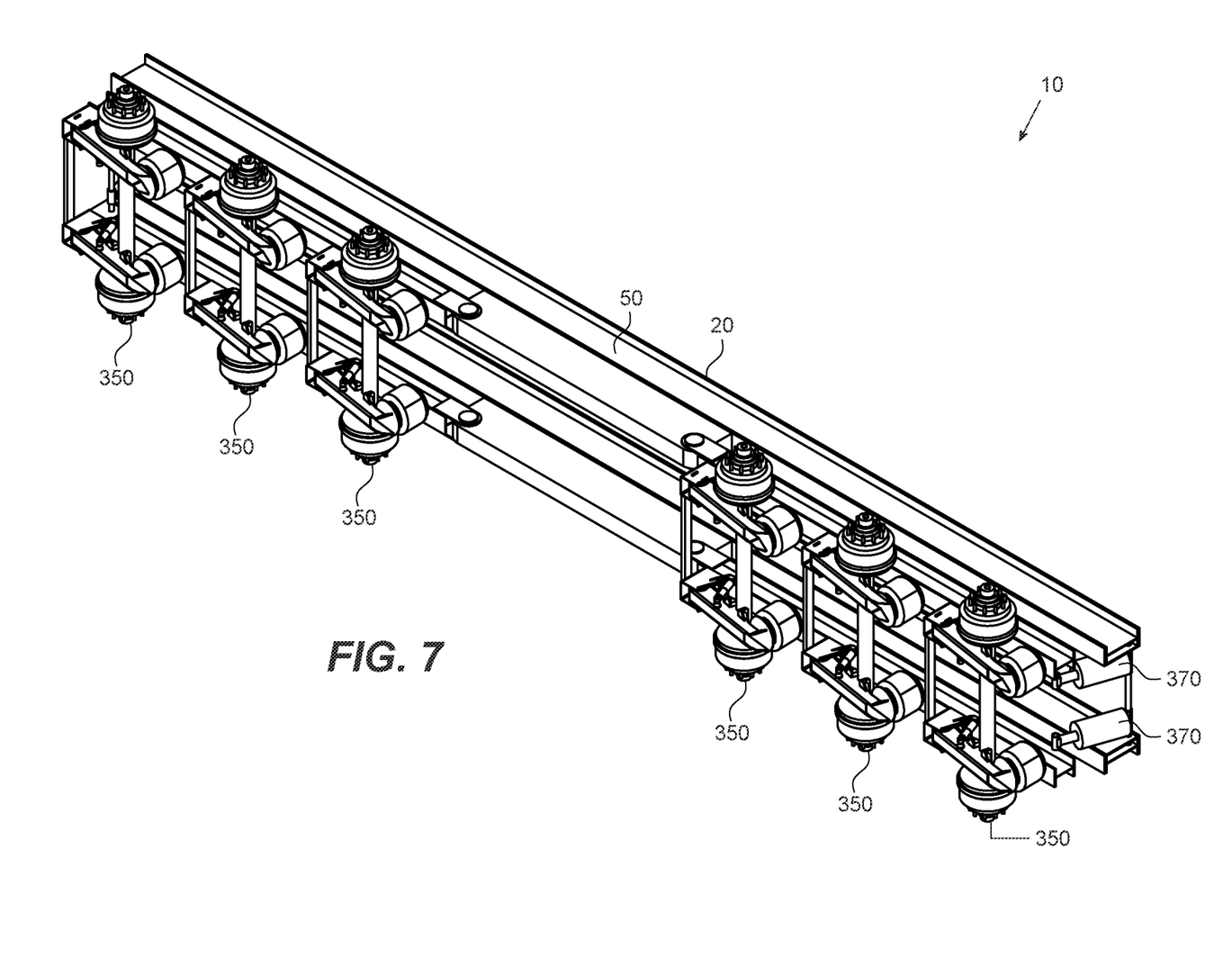
FIG. 7 is an illustration of a preferred embodiment of the invention.
Figure 8:
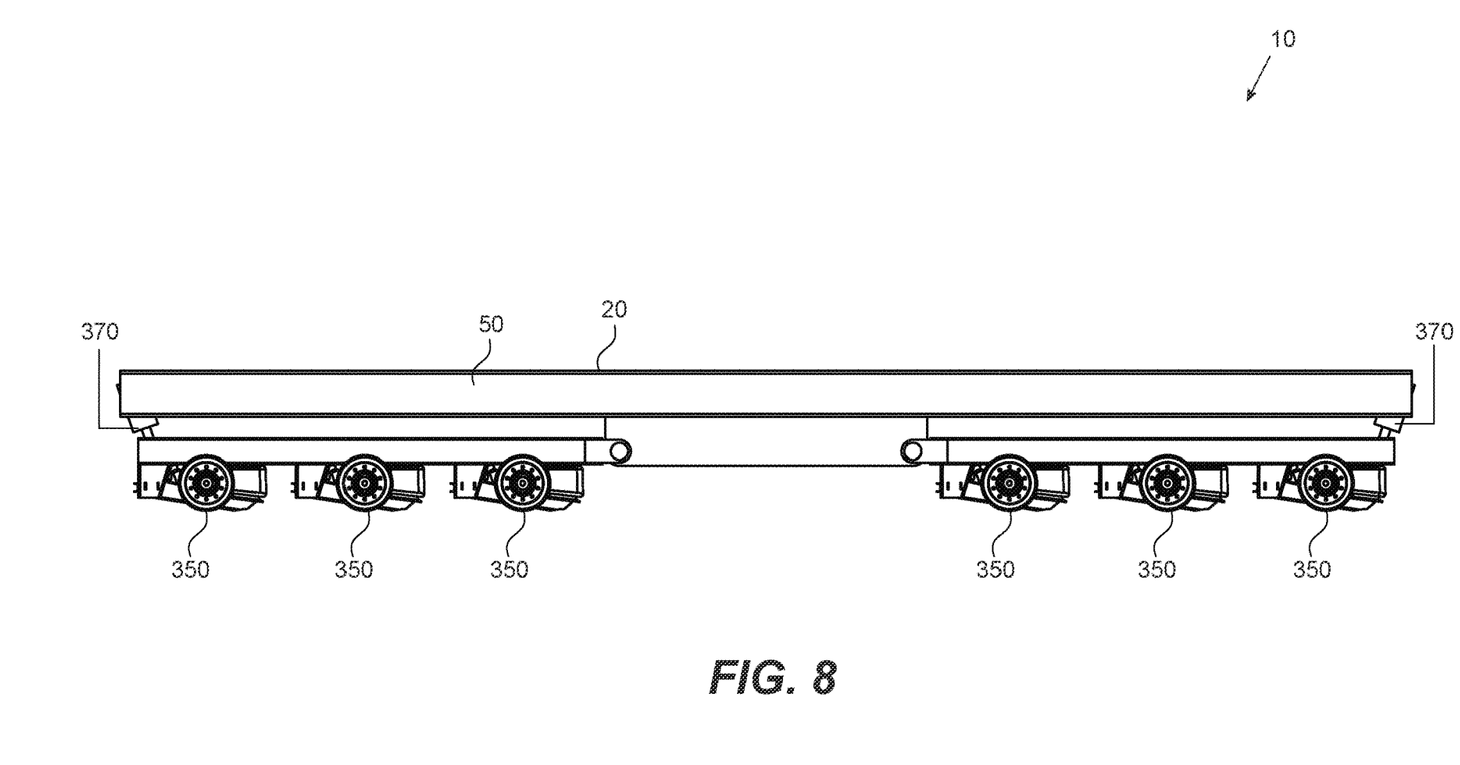
FIG. 8 is an illustration of a preferred embodiment of the invention.

Referring to the illustrations, drawings, and pictures, and to FIGS. 1-8 in particular, reference character 10 generally designates a new and improved trailer and or system in accordance with the present invention. Invention 10 has numerous applications and preferred embodiments and the drawings are for purposes of illustration and should not be considered to limit the scope of the invention as such.

Invention 10 may comprise a trailer main frame 20 having a top 30, bottom 40, first side 50, second side 60, a front 70, and a back 80. A first segment 90 attached to trailer main frame 20 bottom 40 first side 50 having a first aperture 100 and a second aperture 110. A second segment 120 attached to trailer main frame 20 bottom 40 second side 60 having a first aperture 130 and a second aperture 140.

Invention 10 may include trailer main frame 20 first side 50 front 70 first rocker assembly 150 that may have first an end 160, a second end 170, a length 180, a top 190 and a bottom 200 that pivotally attaches to trailer main frame 20 first side 50 first aperture 100 via pivot 105.

Invention 10 may include trailer main frame 20 first side 50 back 80 second rocker assembly 210 that may have a first end 220, a second end 230, a length 235, a top 240 and a bottom 245 that pivotally attaches to trailer 20 first side 50 second aperture 110 via pivot 115.

Invention 10 may include trailer main frame 20 second side 60 front 70 first rocker assembly 225 that may have first end 236, a second end 246, a length 250, a top 260 and a bottom 270 that pivotally attaches to trailer main frame 20 second side 60 first aperture 130 via pivot 135.

Invention 10 may include trailer main frame 20 second side 60 back 80 second rocker assembly 280 that may have first end 290, a second end 300, a length 310, a top 320 and a bottom 330 that pivotally attaches to trailer main frame 20 second side 60 second aperture 140 via pivot 145.

It is contemplated that prior art air ride suspensions 340 may be utilized with numerous prior art axles 350 attached to trailer main frame 20 first side 50 front 70 first rocker assembly 150 bottom 200; trailer main frame 20 first side 50 back 80 second rocker assembly 210 bottom 245; trailer main frame 20 second side 60 front 70 first rocker assembly 225 bottom 270; and trailer main frame 20 second side 60 back 80 second rocker assembly 280 bottom 330. Axles 350 may be two or more as depicted in the illustrations, but should not be limited to same.

Pneumatic Embodiment

In a preferred embodiment, upper air bags also referred to as pneumatic air bags 360 may be utilized between trailer main frame 20 bottom 40 first side 50 front 70 first rocker assembly 150 top 190; first side 50 back 80 second rocker assembly 210 top 240; second side 60 front 70 first rocker assembly 225 top 260; and second side 60 back 80 second rocker assembly 280 top 320 that may utilize air to inflate and or deflate to level trailer main frame 20. Air pressure may come from truck, tractor, and or a unit on trailer main frame 20, and combinations thereof. Air bags 360 may all be connected.

Hydraulic Embodiment Cylinders

In another preferred embodiment, hydraulic cylinders 370 may be utilized between trailer main frame 20 bottom 40 first side 50 front 70 first rocker assembly 150 top 190; first side 50 back 80 second rocker assembly 210 top 240; second side 60 front 70 first rocker assembly 225 top 260; and second side 60 back 80 second rocker assembly 280 top 320. This may be a closed system wherein the cylinders 370 are not connected and act independently.

It is contemplated that invention 10 may be utilized for various applications wherein it may be desirable to transport solids or liquids in bulk in relatively lightweight containers adapted for positioning to transport and then discharge contents efficiently. It is understood that numerous configurations may be utilized and the above examples should not be considered to limit the invention to such. Changes may be made in the combinations, operations, and arrangements of the various parts and elements described herein without departing from the spirit and scope of the invention.

What is claimed is:

1. A trailer main frame with a multi-travel suspension comprising:
    said trailer main frame having a top, a bottom, a front, a back, a first side and a second side;
    a first segment attached to said bottom of said first side of said trailer main frame having a first aperture and a second aperture;
    a second segment attached to said bottom of said second side of said trailer main frame having a first aperture and a second aperture;
    a first rocker assembly pivotally connected to said first aperture of said first segment, pivotally connected to said first aperture of said second segment, and movably attached to said front of said trailer main frame with at least two first hydraulic cylinders;
    a second rocker assembly pivotally connected to said second aperture of said first segment, pivotally connected to said second aperture of said second segment, and movably attached to said back of said trailer main frame with at least two second hydraulic cylinders; and
    wherein said first rocker assembly is connected to said frame independently of said second rocker assembly and adapted for independent travel from said second rocker assembly.

2. A trailer main frame with a multi-travel suspension comprising:
    said trailer main frame having a top, a bottom, a front, a back, a first side and a second side;
    a first segment attached to said bottom of said first side of said trailer main frame having a first aperture and a second aperture;
    a second segment attached to said bottom of said second side of said trailer main frame having a first aperture and a second aperture;
    a first rocker assembly pivotally connected to said first aperture of said first segment, pivotally connected to said first aperture of said second segment, and movably attached to said front of said trailer main frame with at least two first pneumatic air bags;
    a second rocker assembly pivotally connected to said second aperture of said first segment, pivotally connected to said second aperture of said second segment, and movably attached to said back of said trailer main frame with at least two second pneumatic air bags; and
    wherein said first rocker assembly is connected to said frame independently of said second rocker assembly and adapted for independent travel from said second rocker assembly.

* * * * *